(12) United States Patent
Lee

(10) Patent No.: US 10,929,848 B2
(45) Date of Patent: Feb. 23, 2021

(54) ELECTRONIC DEVICE FOR CONTACTLESS PAYMENT

(71) Applicant: HTC Corporation, Taoyuan (TW)

(72) Inventor: Yu-Cheng Lee, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 1357 days.

(21) Appl. No.: 14/549,668

(22) Filed: Nov. 21, 2014

(65) Prior Publication Data

US 2015/0149361 A1    May 28, 2015

Related U.S. Application Data

(60) Provisional application No. 61/916,805, filed on Dec. 17, 2013, provisional application No. 61/907,399, filed on Nov. 22, 2013.

(51) Int. Cl.
*G06Q 20/38* (2012.01)
*G06Q 20/40* (2012.01)
(Continued)

(52) U.S. Cl.
CPC ....... *G06Q 20/40145* (2013.01); *G06Q 20/42* (2013.01); *H04L 63/0853* (2013.01);
(Continued)

(58) Field of Classification Search
CPC .............................................. G06Q 20/40145
(Continued)

(56) References Cited

U.S. PATENT DOCUMENTS 5,229,764 A * 7/1993 Matchett ........... H04W 12/1206
340/5.52
8,289,136 B2 * 10/2012 Beenau ................. H04L 9/3273
340/5.83
(Continued)

FOREIGN PATENT DOCUMENTS

CN    1680965 A    10/2005
CN    1912882 A     2/2007
(Continued)

OTHER PUBLICATIONS

Office Action issued in corresponding Taiwan application 10421695820 dated Dec. 15, 2015.
(Continued)

*Primary Examiner* — Chinedu C Agwumezie
(74) *Attorney, Agent, or Firm* — McClure, Qualey & Rodack, LLP

(57) ABSTRACT

An electronic device and an authentication method thereof are disclosed herein. The electronic device includes a sensor module, a network module, at least one processor and a non-transitory computer-readable medium. The non-transitory computer-readable medium stores a first prestored biometric signature and computer-executable instructions to be executed by the at least one processor for performing the authentication method, in which the first prestored biometric signature is verified and issued by a first payment service. The authentication method includes the following steps: detecting a first biometric signature by the sensor module; determining whether the first biometric signature matches the first prestored biometric signature; authenticating the first payment service if the first biometric signature is determined to match the first prestored biometric signature; and transmitting or receiving data corresponding to the first payment service by the network module.

10 Claims, 8 Drawing Sheets

(51) Int. Cl.
*H04L 29/06* (2006.01)
*G06Q 20/42* (2012.01)
*H04W 12/06* (2021.01)

(52) U.S. Cl.
CPC ......... *H04L 63/0861* (2013.01); *H04W 12/06* (2013.01); *H04L 2463/102* (2013.01)

(58) Field of Classification Search
USPC .................................................. 705/44, 75
See application file for complete search history.

(56) References Cited

U.S. PATENT DOCUMENTS

| | | | |
|---|---|---|---|
| 9,112,701 B2 | 8/2015 | Sano et al. | |
| 2007/0088950 A1 | 4/2007 | Wheeler et al. | |
| 2007/0195989 A1* | 8/2007 | Tsubata | A61B 5/02455 382/100 |
| 2008/0244699 A1* | 10/2008 | Parhofer | F41A 17/063 726/2 |
| 2012/0197743 A1 | 8/2012 | Grigg et al. | |
| 2013/0054473 A1 | 2/2013 | Jan et al. | |
| 2013/0200143 A1 | 8/2013 | Callegari et al. | |
| 2013/0246270 A1 | 9/2013 | Du et al. | |

FOREIGN PATENT DOCUMENTS

| | | |
|---|---|---|
| CN | 101246532 A | 8/2008 |
| CN | 101421744 A | 4/2009 |
| CN | 103310142 A | 9/2013 |
| CN | 103310339 A | 9/2013 |
| TW | 201310363 A | 3/2013 |
| TW | 201337812 A | 9/2013 |
| TW | M461081 U1 | 9/2013 |
| WO | 2008/008830 A2 | 1/2008 |

OTHER PUBLICATIONS

Office Action issued in corresponding China patent application dated Aug. 1, 2017.

* cited by examiner

ELECTRONIC DEVICE FOR CONTACTLESS PAYMENT

RELATED APPLICATIONS

This application claims the priority benefit of U.S. Provisional Application Ser. No. 61/907,399, filed Nov. 22, 2013, and U.S. Provisional Application Ser. No. 61/916,805, filed Dec. 17, 2013, which are herein incorporated by reference.

BACKGROUND

Field of Invention

The present disclosure relates to an electronic device supporting payment services. More particularly, the present disclosure relates to an electronic device supporting contactless payment services according to biometric signatures.

Description of Related Art

Nowadays, various types of payment, e.g. cash, check, or credit cards, are provided to consumers in the stores. In addition, consumers may even purchase products using application programs running on the mobile devices, in which the mobile devices are equipped with contactless payment technology, which allows the user to conduct the payment at a point of sale (POS) terminal without physical contact.

Compared to the radio-frequency identification (RFID) used in the credit cards, proximity wireless communications are adopted in the portable devices so as to enable the portable devices complete contactless payment through the radio communication. Generally, the proximity wireless communication is the Near-field Communication (NFC).

Although great convenience is brought by the contactless payment of the mobile device, security issues still exist in the current payment mechanism. As a result, there is a need to provide a more secure payment mechanism to the users such that the contactless payment could be conducted in a more secure way.

SUMMARY

The disclosure provides an electronic device. The electronic device includes a sensor module, a network module, at least one processor and a non-transitory computer-readable medium. The non-transitory computer-readable medium stores a first prestored biometric signature and computer-executable instructions to be executed by the at least one processor for performing the authentication method, in which the first prestored biometric signature is verified and issued by a first payment service. The authentication method includes the following steps: detecting a first biometric signature by the sensor module; determining whether the first biometric signature matches the first prestored biometric signature; authenticating the first payment service if the first biometric signature is determined to match the first prestored biometric signature; and transmitting or receiving data corresponding to the first payment service by the network module.

The disclosure provides an authentication method for an electronic device. The authentication method includes the following steps: detecting a first biometric signature by a sensor module of the electronic device; determining whether the first biometric signature matches a first prestored biometric signature stored in the electronic device, wherein the first prestored biometric signature is verified and issued by a first payment service; authenticating the first payment service if the biometric signature is determined to match the first prestored biometric signature; and transmitting or receiving data corresponding to the first payment service.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
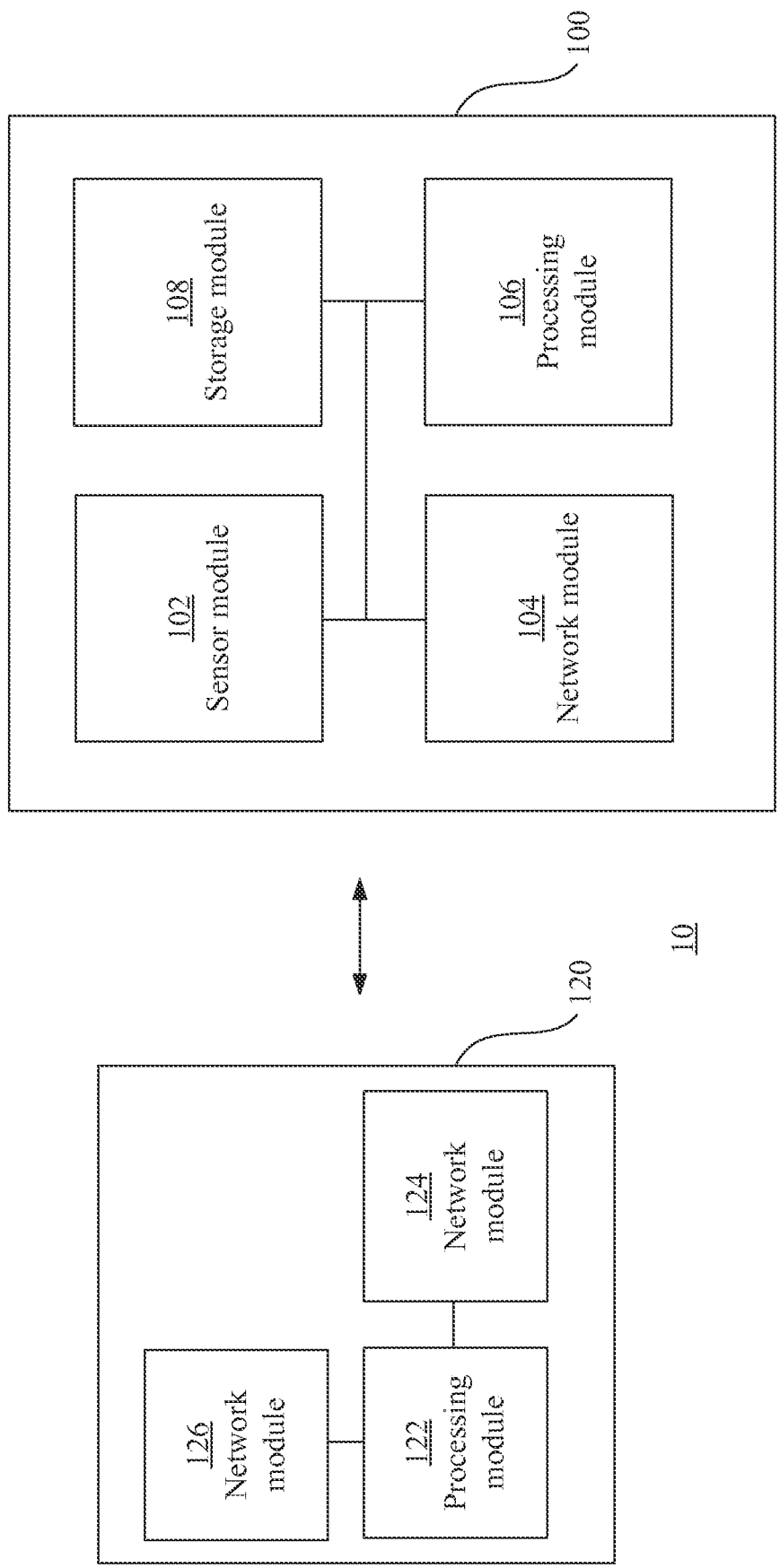
FIG. 1 is a schematic diagram illustrating a payment system according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms first, second, third etc. may be used herein to describe various elements or modules, these elements or modules should not be limited by these terms. These terms are only used to distinguish one element or module from other elements or modules. Thus, a first element or module discussed below could be termed a second element or module without departing from the teachings of the present disclosure It will be understood that when an element is referred to as being "connected" or "coupled" to another element, it can be directly connected or coupled to the other element or intervening elements may be present.

Referring to FIG. 1, a schematic diagram illustrating a payment system 10 according to one embodiment of the disclosure is presented. The payment system 10 comprises an electronic device 100 and a point of sale (POS) terminal 120. The electronic device 100 connects to the POS terminal 120 through a proximity wireless network so as to conduct a payment without physical contact. The electronic device 100 comprises a sensor module 102, a network module 104, a processing module 106 and a storage module 108. The POS terminal 120 comprises a processing module 122, a network module 124 and a network module 126. The sensor module 102, the network module 104, the processing module 106 and the storage module 108 are electrically coupled with each other. The processing module 122, the network module 124 and the network module 126 are electrically coupled with each other.

The sensor module 102 comprises at least one sensor, in which the at least one sensor is configured to detect at least one biometric signature. For example, the biometric signature may be a fingerprint, a facial recognition, an electrocardiography (ECG or EKG), a voice characteristic, or other biometric signatures that may be used to verify user's identity. Accordingly, the sensor may be a fingerprint scanner, an imaging capture unit, a biopotential sensor, a microphone unit or other sensors used to detect the user's biometric signatures.

The network module 104 is configured to transmit/receive data to/from the POS terminal 120 through a proximity wireless network. In some embodiments, the proximity wireless network may be Near-Field communication (NFC) network.

In some embodiments, the electronic device 100 may further include another network module configured to transmit/receive data to/from another electronic device, base station or wireless access point through another wireless network, e.g., Wi-Fi, bluetooth, mobile network, etc.

The processing module 106 comprises at least one processor. The at least one processor is configured to execute computer-executable instructions and to transmit/receive signals (e.g., control signals or data signals) to/from the sensor module 102, the network module 104 and the storage module 108 respectively.

Figure 2A:
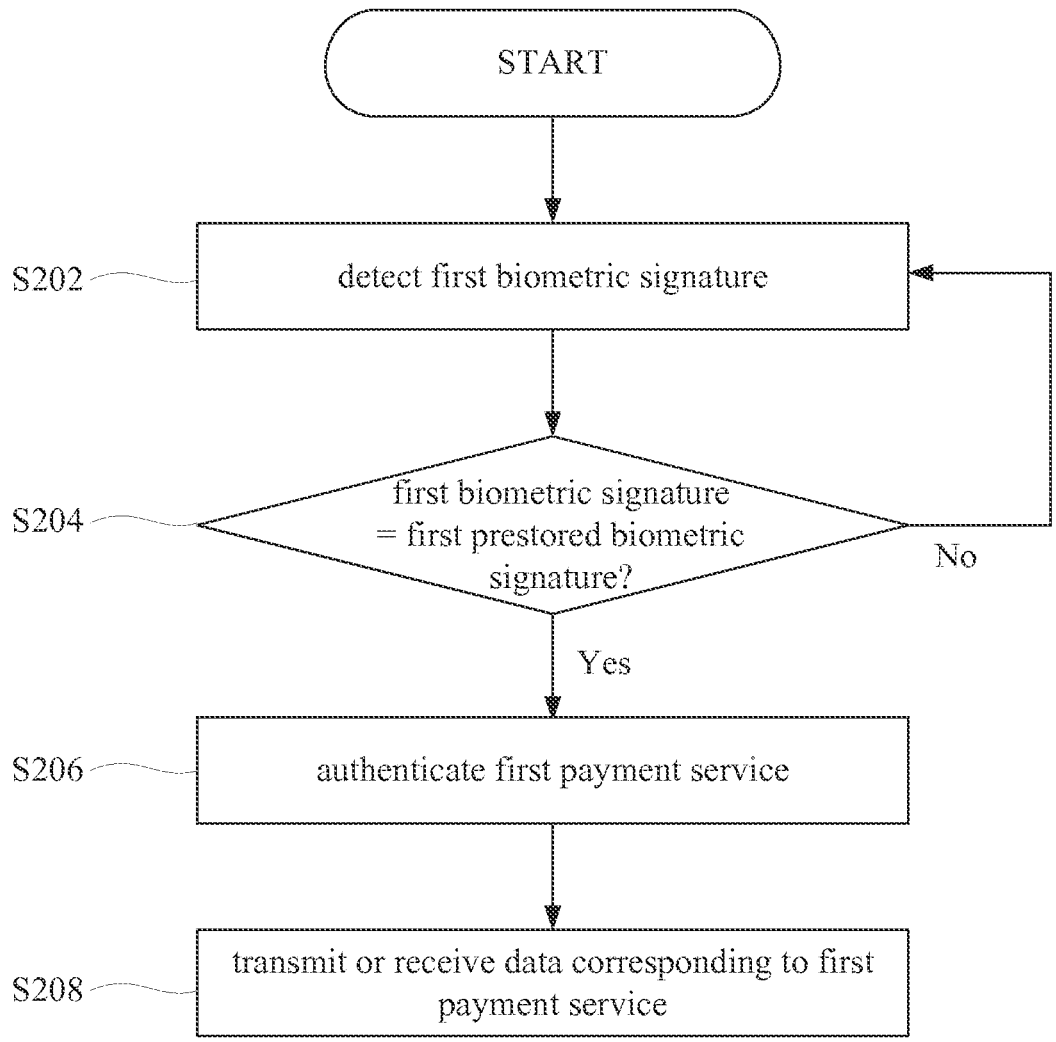
FIG. 2A is a flow diagram illustrating an authentication method according to one embodiment of the disclosure.

The storage module 108 stores at least one set of account information and computer-executable instructions to be executed by the at least one processor for performing an authentication method 200 as shown in FIG. 2A. Each set of account information includes at least one prestored biometric signature, in which the prestored biometric signature is configured to identify whether the user of the electronic device 100 is the one owning the account of the payment service. It should be noted that the prestored biometric signature is recorded and stored when the account is open. On the other hand, the authentication method 200 is configured to authenticate a payment service corresponding to the account information. In other words, the authentication method 200 is configured to authenticate the payment service corresponding to the prestored biometric signature.

Referring also to FIG. 2A, a flow diagram illustrating an authentication method 200 according to one embodiment of the disclosure is presented. In step S202, the processing module 106 sends at least one control signal to the sensor module 102 such that the sensor module 102 starts to detect a first biometric signature.

In step S204, the processing module 106 is configured to determine whether the first biometric signature matches a first prestored biometric signature stored in the storage module 108. If the first biometric signature is determined not to match the first prestored biometric signature, the flow goes back to step S202. Otherwise, if the biometric signature is determined to match the prestored biometric signature, the flow goes to step S206.

For instance, if the first biometric signature is a fingerprint, the processing module 106 is configured to compare the fingerprint detected by the sensor module 102 with the prestored fingerprint corresponding to the user owning the account. If a difference between data corresponding to the detected fingerprint and data corresponding to the prestored fingerprint is greater than a threshold value, the flow goes back to step S202. Otherwise, the flow goes to step S206.

In some embodiments, if the first biometric signature is determined not to match the first prestored biometric signature in step S204, the processing module 106 disables all functions requiring personal identification of the electronic device 100 except time functions, e.g., a clock function and/or a calendar function. In other words, if the first biometric signature is determined not to match the first prestored biometric signature, the electronic device 100 acts as a watch having only the time functions, and the authentication method 200 ends such that step S206 and step S208 are omitted.

In step S206, the processing module 106 authenticates the payment service corresponding to the matched prestored biometric signature.

In some embodiments, the electronic device 100 may store a plurality of sets of account information corresponding to different payment services or to different users, in which each set of account information includes at least one prestored biometric signature. Similarly, the processing module 106 is configured to authenticate the payment services corresponding to the matched prestored biometric signatures respectively.

In step S208, the processing module 106 sends signals to the network module 104 such that the network module 104 transmits or receives data corresponding to the payment service.

Based on those mentioned above, comparison of biometric signatures is adopted for identifying whether the user of the electronic device is the one owning the account, which makes the electronic device 100 and the authentication method 200 provide a more secure contactless payment mechanism.

Figure 2B:
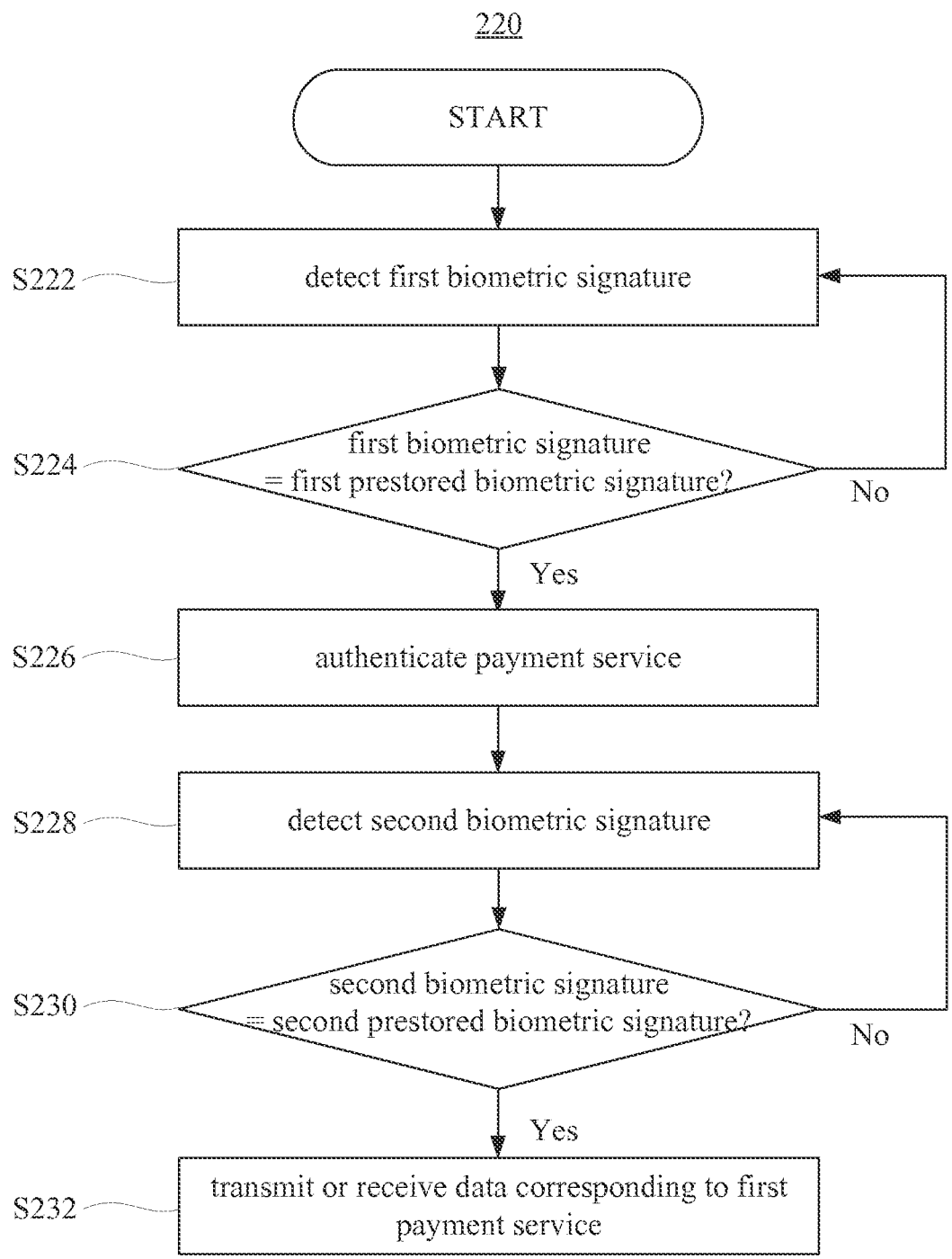
FIG. 2B is a flow diagram illustrating an authentication method according to one embodiment of the disclosure.

Referring to both FIG. 1 and FIG. 2B, a flow diagram illustrating an authentication method 220 according to one embodiment of the disclosure is presented. Compared to the authentication method 200 in FIG. 2A, the authentication method 220 in FIG. 2B further illustrates one extended embodiment of step S208 shown in FIG. 2A.

Step S222, step S224 and step S226 are similar to step S202, step S204 and step S206 in FIG. 2A respectively.

In some embodiments, regarding to step S224, if the first biometric signature is determined not to match the first prestored biometric signature, the processing module 106 disables all functions requiring personal identification of the electronic device 100 except time functions, e.g., a clock function and/or a calendar function. In other words, if the first biometric signature is determined not to match the first prestored biometric signature, the electronic device 100 acts as a watch having only the time functions, and the authentication method 220 ends such that step S226, step S228, step S230 and step S232 are omitted.

In step S228, the processing module 106 transmits at least one control signal to the sensor module 102 such that the sensor module 102 starts to detect a second biometric signature.

In some embodiments, the first biometric signature and the second biometric signature may be different biometric signatures or a same biometric signature.

In some embodiments, the sensor module 102 detects the second biometric signature when or after a confirmation input is detected by the sensor module 102 or another input module (not shown in figures). For example, if the user would like to purchase a product in the store, the user would first enters an confirmation input, and the sensor module 102 detects the second biometric signature when or after the confirmation input is detected.

In some embodiments, the detection in step S224 or in step S228 may include sampling and calculating operations. In more details, the sensor module 102 samples a first biometric input by the sensor module 102 for a first sampling time duration, and the sensor module 102 samples a second biometric input by the sensor module 102 for a second sampling time duration. The processing module 106 calculates the first biometric signature according to the sampled first biometric input, and the processing module 106 calculates the second biometric signature according to the sampled second biometric input. In some embodiments, the mentioned calculation may be the average of the sampled biometric input (the sampled first biometric input or the sampled second biometric input).

It should be noted that the first sampling time duration is equal to or greater than the second sampling time duration. Generally speaking, the comparison of the detected biometric signature and the prestored biometric signature is highly related to the precision of the detected biometric signature, and the sampling time duration of the biometric input is a significant factor which directly affects the detection performance of the biometric signature. Since the comparison corresponding to the first biometric signature is configured for authenticating the payment service, the comparison corresponding to the first biometric signature requires a higher precision so as to make the authentication of the payment service more secure. Therefore, the first sampling time duration should be long enough such that the comparison would be more precise. On the other hand, since the comparison corresponding to the second biometric signature is configured for purchasing products using the payment service, the comparison requires an equal or less precision so as to make the user purchase the products in a more secure or in a more efficient way. Therefore, the second sampling time duration is equal to or less than the first sampling time duration.

In some embodiments, the first sampling time duration may be 10 second, and the second sampling time duration may be ranged from 1 to 10 seconds.

In step S230, the processing module 106 is configured to determine whether the second biometric signature matches the second prestored biometric signature. If the second biometric signature is determined not to match the second prestored biometric signature, the flow goes back to step S228. Otherwise, if the second biometric signature is determined to match the second prestored biometric signature, the flow goes to step S232.

In some embodiments, determining whether the detected biometric signature matches the prestored biometric signature in step S224 or in step S230 includes calculating and comparing operations. In more details, the processing module 106 is configured to calculate a first difference between the first biometric signature and the first prestored biometric signature, in which the first biometric signature is determined to match the first prestored biometric signature if the first difference is less than or equal to a first threshold value. The processing module 106 is configured to calculate a second difference between the second biometric signature and the second prestored biometric signature, in which the second biometric signature is determined to match the second prestored biometric signature if the second difference is less than or equal to a second threshold value.

It should be noted that the first threshold value is less than or equal to the second threshold value. Since the comparison corresponding to the first biometric signature is configured for authenticating the payment service, the comparison corresponding to the first biometric signature requires a higher precision so as to let the authentication of the payment service more secure. On the other hand, since the comparison corresponding to the second biometric signature is configured for purchasing products using the payment service, the comparison requires an equal or less precision so as to let the user purchase the products in a more secure or in a more efficient way. Therefore, the first threshold value is less than or equal to the second threshold value.

In some embodiments, the second biometric signature and the second prestored biometric signature are cardiac pulses, and the second biometric signature is determined to match the second prestored biometric signature if a number of pulses corresponding to the second biometric signature is greater than 0.

In step S232, the processing module 106 transmits signals to the network module 104 such that the network module 104 transmits or receives data corresponding to the payment service.

As a result, the authentication method 220 provided in the present embodiment compares biometric signatures twice for authenticating the payment service and activating the transmission of data corresponding to the payment service respectively.

Figure 3A:
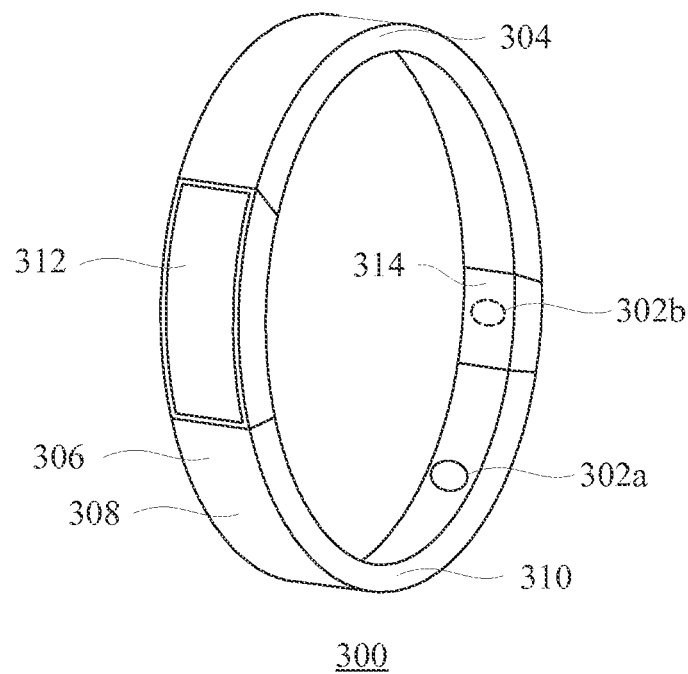
FIG. 3A is a schematic diagram illustrating an electronic device according to one embodiment of the disclosure.

Referring to FIG. 3A, a schematic diagram illustrating an electronic device 300 according to one embodiment of the disclosure is presented. The electronic device 300 is one exemplary embodiment of the electronic device 100 shown in FIG. 1. The electronic device 300 includes a first sensor 302a, a second sensor 302b, a Near Field Communication (NFC) module 304, a processing module 306 and a storage module 308. Compared to the electronic device 100 shown in FIG. 1, the electronic device 300 further comprises a wireless module 310, a touch display 312 and a buckle mechanism 314. The electronic device 300 is designed in a ring-shape such that a user may wear the electronic device 300 on the wrist. In some embodiments, the electronic device 300 is also viewed as a wearable device.

The first sensor 302a and the second sensor 302b may be viewed as a sensor module (not shown in FIG. 3A) similar to the sensor module 102 shown in FIG. 1. The first sensor 302a and the second sensor 302b are configured to detect a biometric signature of the user as a personal identification for activating the payment service of the electronic device 300. In the present embodiment, the ECG is utilized as the biometric signature to identify the user. With reference to FIG. 3A, the first sensor 302a is disposed on an inner surface of the electronic device 300. The second sensor 302b is disposed on an outer surface of the electronic device 300 opposing to the inner surface, where the second sensor 302b is illustrated in a dotted circuit in FIG. 3A. In other words, the first sensor 302a and the second sensor 302b are disposed on the surfaces of the electronic device 300 opposite to each other. The first sensor 302a and the second sensor 302b are configured to collect the ECG of the user who wears the electronic device 300.

Figure 3B:
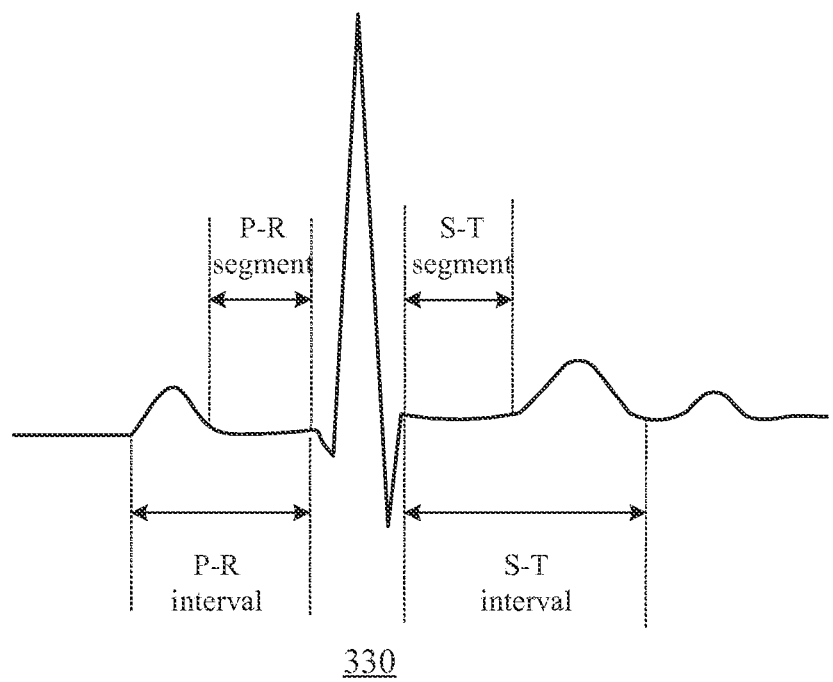
FIG. 3B is a schematic diagram illustrating an ECG waveform measured by an electronic device according to one embodiment of the disclosure.

In more details, referring also to FIG. 3B, a schematic diagram illustrating an ECG waveform 330 measured by the first sensor 302a and the second sensor 302b according to one of the embodiments is presented. Electrical activities of a heart of the user may be detected by the first sensor 302a and the second sensor 302b and illustrated as the ECG waveform 330 in FIG. 3B. It should be noted that a characteristic of the ECG waveform 330 representing the ECG of the user is unique. In other words, each individual has different ECG characteristics. Therefore, it is beneficial to utilize the ECG as the biometric signature to identify the user.

Figure 4:
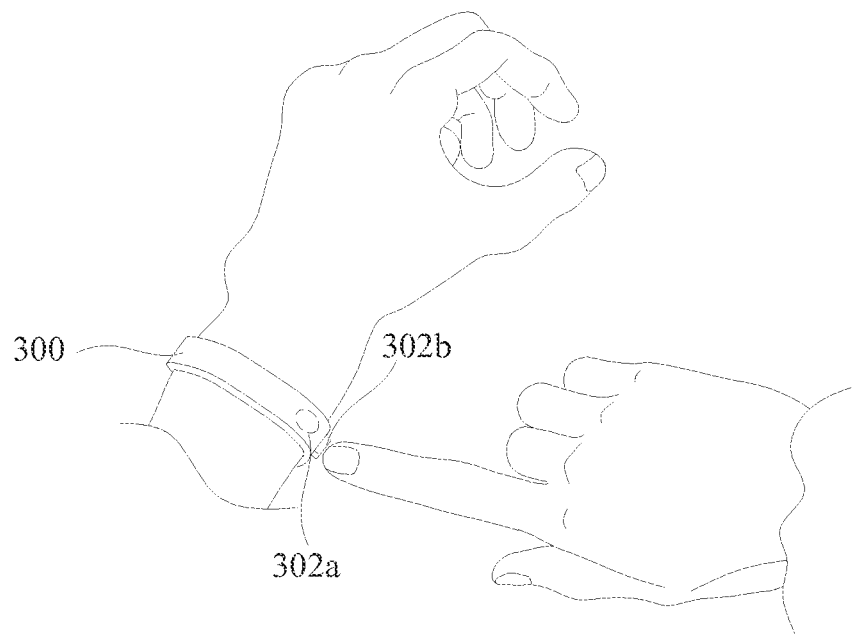
FIG. 4 is a schematic diagram illustrating an operation of an electronic device according to one embodiment of the disclosure.
Figure 4:
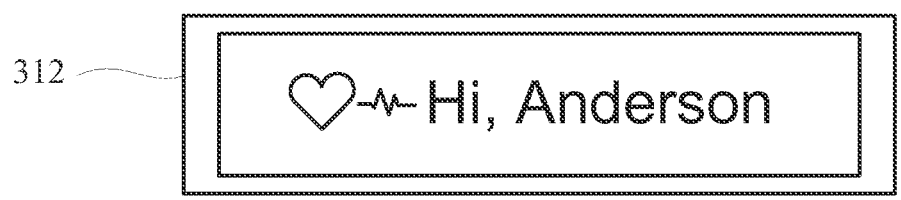

Referring also to FIG. 4, a schematic diagram illustrating an operation of an electronic device 300 according to one embodiment of the disclosure is presented. The user wears the electronic device 300 on a left hand of the user around the wrist, where the first sensor 302a is disposed at inner surface of the electronic device 300 facing toward the left hand, and the second sensor 302b is disposed at outer surface of the electronic device 300. Under such configuration, the first sensor 302a is in contact with the left hand of the user. In order to measure the ECG of the user, a right hand of the user is in contact with the second sensor 302b of the electronic device 300. As illustrated in FIG. 4, a finger of the right hand is in contact with the second sensor 302b. In other words, the left hand and the right hand of the user are in contact with the first sensor 302a and the second sensor 302b, respectively.

In the present embodiment, if the biometric signature (i.e., the ECG) is determined to match the prestored biometric signature in the electronic device 300, the touch display 312 displays a welcome message to the user.

In some embodiments, a fingerprint of the user may be utilized as the biometric signature, where the user may swipe his/her finger on a fingerprint scanner, in which the fingerprint scanner may be implemented as the second sensor 302b. Furthermore, a facial recognition, a speech recognition, etc. may also be utilized as the biometric signature of the user in other embodiments.

Referring back to FIG. 3A, the NFC module 304 is configured to transmit or receive data corresponding to the payment service. For example, the NFC module 304 may transmit data corresponding to one of the payment services to the POS terminal as the user makes a contactless payment for a purchase. On the other hand, the NFC module 304 may act as a contactless POS terminal, which receives payment information through the contactless payment from other NFC devices. It should be noted that the aforementioned functions of transmitting or receiving data corresponding to the payment services of the NFC module 304 may be manually disabled by the user to avoid fraud, improper hacking or making a payment by mistake.

The processing module 306 is configured to determine whether the user is authorized to use the payment service in the electronic device 300 according to the detected biometric signature and the prestored biometric signature. For example, the detected ECG may be utilized to compare with the prestored ECG that is already stored in the storage module 308, in which the prestored ECG is verified and issued by a payment service. If the detected ECG waveform 330 is determined to match the prestored ECG the payment service is authenticated, which make the account information corresponding to the payment service be loaded.

In some embodiments, the account information may include personal information, payment cards information owned by the user, etc.

The wireless module 310 may be configured to transmit or receive data. In the embodiment, the wireless module 310 may comprises a bluetooth module and/or a Wi-Fi module. The bluetooth module is configured to pair the electronic device 300 with other connected devices for online transaction. The Wi-Fi module is configured to connect to the Internet for online transaction or location detection for a location based service (LBS).

It should be noted that an update might be performed by the electronic device 300 when a data connection is available through the wireless module 310. For example, the update may be related to software, firmware, security protocols or any other functions of the electronic device.

The touch display 312 is configured to display information and allows the user to control the electronic device 300 with user's touch. For example, the user may select one payment type, such as VISA, MasterCard or AMEX, with a sliding operation applied by a finger of the user on the touch display 312. Furthermore, the user may enter a payable amount by scrolling through the digital numbers with the sliding operation on the touch display 312.

In some embodiments, the user may enter the payment card account number and other information through touch operations applied on the touch display 312.

Figure 5A:
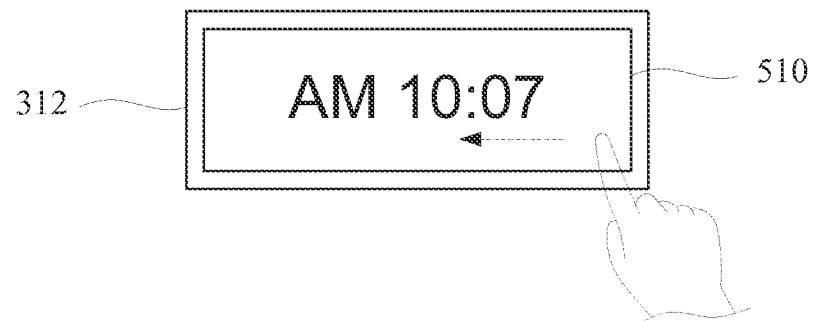
FIG. 5A-FIG. 5C are schematic diagrams illustrating a series of operations of an electronic device according to one embodiment of the disclosure.
Figure 5B:
Figure 5C:
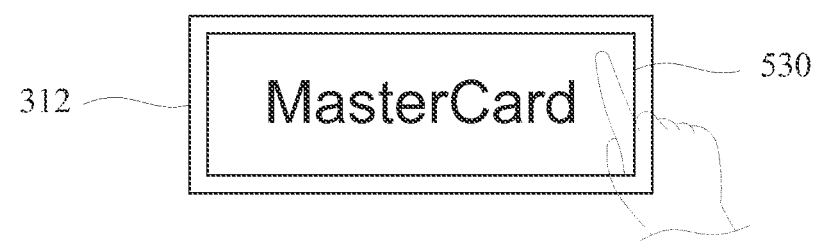

Referring also to FIGS. 5A-5C, schematic diagrams illustrating a series of operations of the electronic device 300 according to one embodiment of the disclosure. In the embodiment, the electronic device 300 supports a plurality of payment types, such as VISA, MasterCard, AMEX, etc., in which prestored biometric signatures of the payment types are matched by biometric signature(s) of the user. Before the user makes a payment at the POS terminal 120 with the electronic device 300, the user may select one of the payment types embedded in the electronic device 300.

In FIG. 5A, the touch display 312 may display a clock screen 510 (i.e., AM 10:07) by default. To select one of the payment types, a sliding operation may be applied on the touch display 312. In the present embodiment, a sliding operation towards left or right is applied to switch the clock screen 510 of the touch display 312 to a screen 520 displaying one of the payment types in FIG. 5B. In FIG. 5B, a list of the payment types may be scrolled by the touch so as to select the desired payment type (i.e., MasterCard shown on a screen 530 in FIG. 5C).

In some embodiments, another sliding operation towards up/down or other hand gestures (e.g., multi-finger operation) may be applied to switch the display screen of the touch display 312 from the clock screen 510 to the screen 520 displaying the payment type.

In the present embodiment, the list of the payment type may include a first payment type (e.g., VISA), a second payment type (e.g., American Express) and a third payment type (e.g., MasterCard). In more details, the first payment type may be displayed on the touch display 312 after the clock screen 510 when the sliding operation is applied. From the first payment type, other payment types may be selected by scrolling through the list of the payment type with an upward (or downward) sliding operation. For example, the second payment type may be displayed when the upward sliding operation is applied to the touch display 312. From the second payment type, the third payment type may be displayed when another upward sliding operation is applied. If another upward sliding operation is applied while the last payment types (i.e., the third payment type) within the list of the payment types is displayed, the list of the payment types scrolls back to the first payment type. On the other hand, if a downward sliding operation is applied while the third payment type is displayed, the list of the payment types scrolls back to the second payment type.

In some embodiments, payment services issued by different financial institutes may be selected. For example, the first payment type may include a first payment service and a second payment service, where the first payment service and the second payment service are issued by different financial institutes. In more details, another sliding operation toward the right may be applied to the touch display 312 while the first payment type is displayed. Afterward, the first payment service or the second payment service may be selected by scrolling through the list of the payment cards. The selection of the payment services is similar to the selection of the payment types, thus the detail description is omitted.

In some embodiments, a barcode may be generated on the touch display 312 for payment service. For example, a barcode of a gift card may be displayed on the screen of the touch display 312 for a checkout register to scan, and the payable amount may be deducted from the gift card. Similarly, a barcode of a coupon may also be displayed on the touch display 312, so that the discount of the coupon may be applied to the payable amount at the checkout register.

Referring back to FIG. 3A, the buckling mechanism 314 of the electronic device 300 may be configured to fasten one end of the electronic device 300 to another end of the electronic device 300 such that the electronic device 300 is fastened around the user's wrist. In the embodiment, the buckling mechanism 314 may include a microUSB connector which is configured to detect whether two ends of the electronic device 300 are buckled together. When two ends of the electronic device 300 are buckled together, the buckling mechanism 314 is fastened, and the electronic device 300 is around user's wrist. On the other hand, when two ends of the electronic device 300 are not buckle together, such as when the user takes off the electronic device 300 from the wrist, the buckling mechanism 314 is considered to be open. When the buckling mechanism 314 is open, the microUSB connector may be configured to connect to a personal electronic device (e.g., a computer, a laptop, etc.) for data transmission or power charge. On the other hand, when the buckling mechanism 314 is buckled and secured around the user's wrist, the electronic device 300 may detect the biometric signature from the user.

In some embodiments, the biometric signature is detected by the sensor module (i.e., the first sensor 302a and the second sensor 302b) when or after the buckle mechanism 314 is fastened, and the authenticated payment service is invalidated when or after the buckle mechanism 314 is open.

In some embodiments, the second sensor 302b is disposed on an outer surface of the buckling mechanism 314 such that the second sensor 302b is more accessible to the user when the buckle mechanism 314 is fastened.

Figure 6:
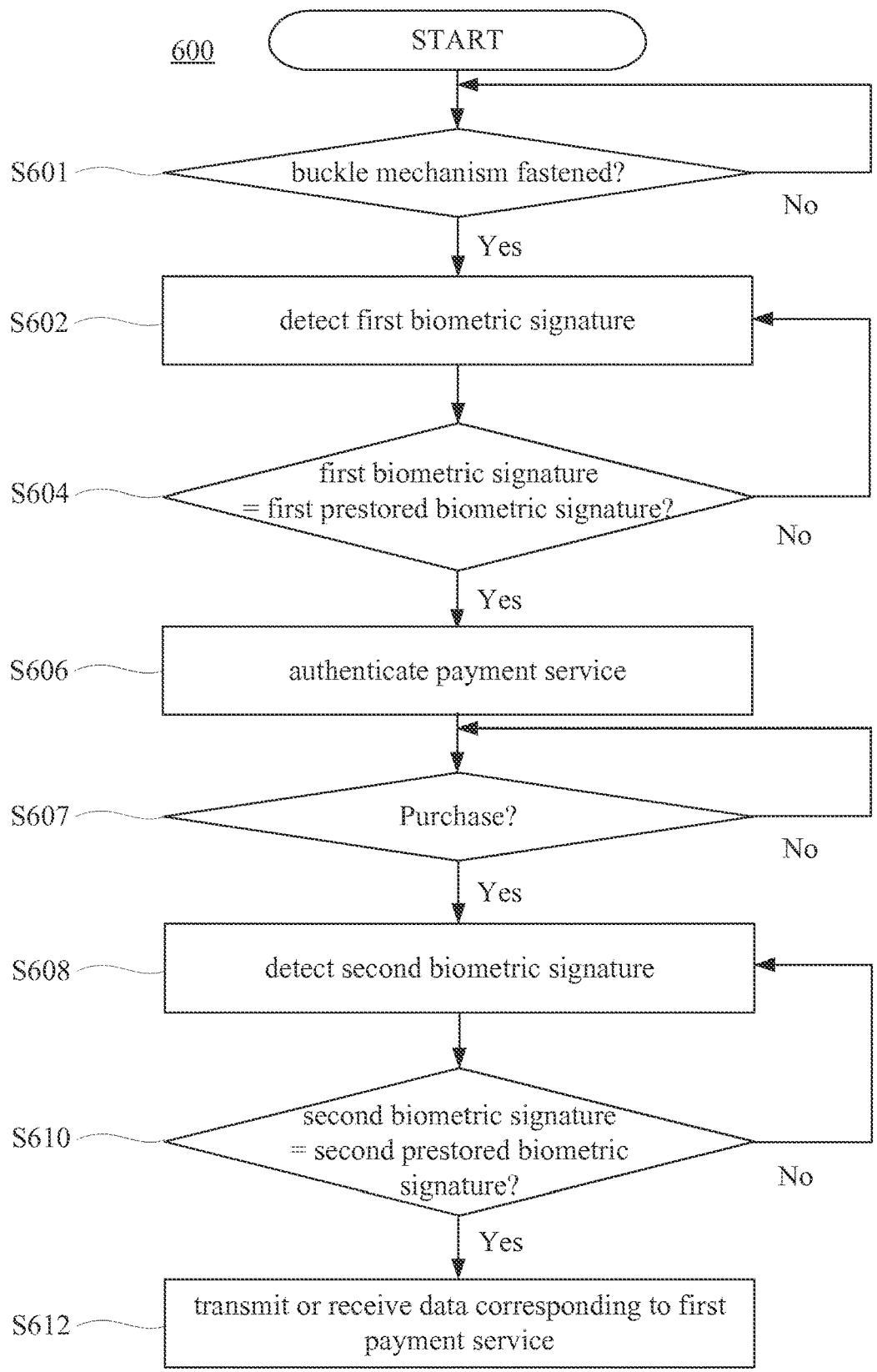
FIG. 6 is a flow diagram illustrating an authentication method according to one embodiment of the disclosure.

Reference is now made to FIG. 6 in order to illustrate complete operations of the electronic device 300. FIG. 6 is a flow diagram illustrating an authentication method 600 according to one embodiment of the disclosure. Compared to the authentication method 220 shown in FIG. 2B, step S602, step S604, step S606, step S608, step S610, step S612 in FIG. 6 are similar to step S222, step S224, step S226, step S228, step S230 and step S232 in FIG. 2B respectively, and the authentication method 600 further includes step S601 and step S607.

In some embodiments, regarding to step S604, if the first biometric signature is determined not to match the first prestored biometric signature, the processing module 306 disables all functions requiring personal identification of the electronic device 300 except time functions, e.g., a clock function and/or a calendar function. In other words, if the first biometric signature is determined not to match the first prestored biometric signature, the electronic device 300 acts as a watch having only the time functions, and the authentication method 600 ends such that step S606, step S607, step S608, step S610 and step S612 are omitted.

In step S601, the buckle mechanism 314 is checked whether it is fastened. In some embodiments, the processing module 306 checks whether the buckle mechanism 314 is fastened. If the buckle mechanism 314 is fastened, the flow goes to step S602 such that the first sensor 302a and the second sensor 302b begin to detect the first biometric signature (i.e., the ECG). Otherwise, the flow stays in step S601.

In step S607, it is checked whether a confirmation input for a purchase exists. If the confirmation input is detected, the flow goes to step S608 such that the first sensor 302a and the second sensor 302b begin to sense the second biometric signature. Otherwise, the flow stays in step S607.

In some embodiments, only the second sensor 302b is configured to sense the second biometric signature.

It should be noted that whenever the buckle mechanism 314 is open, the authenticated payment services are invalidated in any step of the authentication method 600.

Figure 7A:
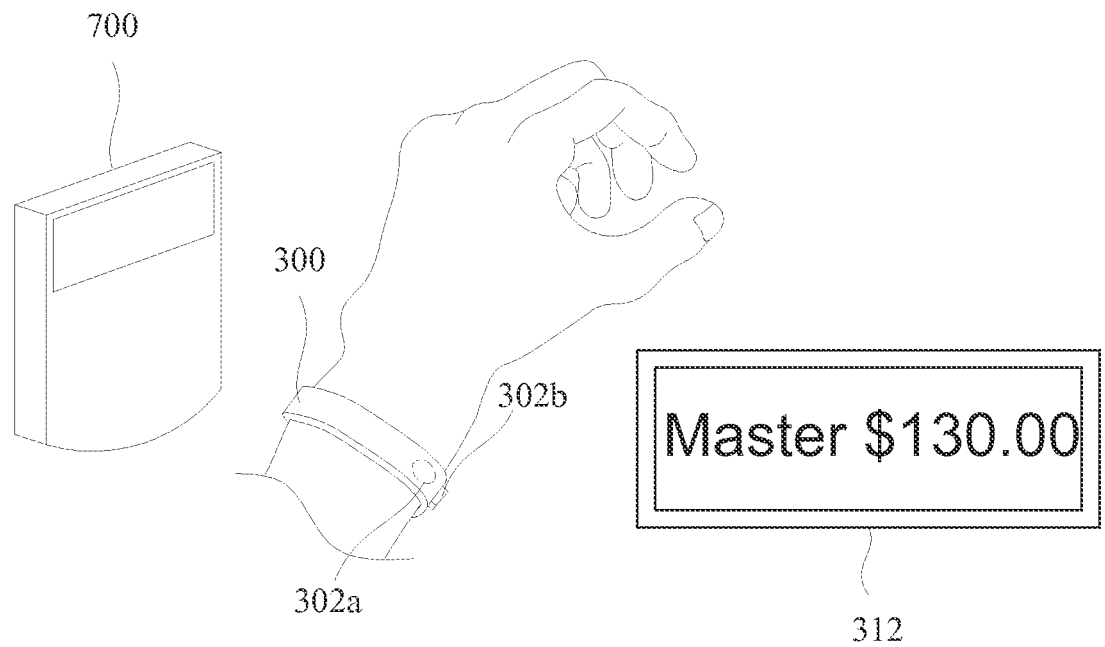
FIG. 7A is a schematic diagram illustrating an operation of an electronic device according to one embodiment of the disclosure.
Figure 7B:
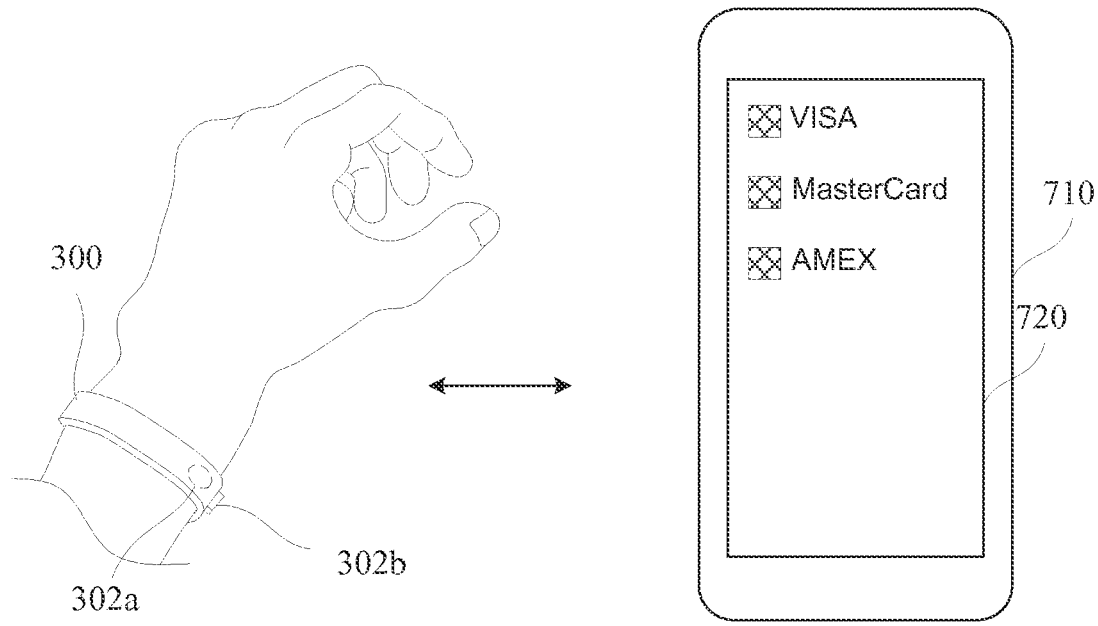
FIG. 7B is a schematic diagram illustrating an operation of an electronic device according to one embodiment of the disclosure.

Reference is made to both FIG. 7A and FIG. 7B for illustrating other features of the electronic device 300. Referring to FIG. 7A, a diagram illustrating the display of a charged payment amount on the touch display 312 according to the embodiment of the disclosure. When the payment transaction is authenticated, the POS terminal 700 may transmit a payment amount that is charged to the electronic device 300, and accordingly, the touch display 312 of the electronic device 300 may display the payment amount that is charged, so that the user is informed of the payment amount to avoid incorrect payment transaction.

FIG. 7B is a diagram illustrating a payment history of the electronic device 300 according to one embodiment of the disclosure. In the embodiment, the electronic device 300 automatically stores the payment transactions, then organizes and balances the payment transactions. For each of the payment transactions, the electronic device 300 may record the payment transactions, where the date, time, location, name of payee, and/or payment amount corresponding the payment transactions are recorded in the electronic device 300. In other words, the electronic device 300 automatically performs bookkeeping for the user. The payment transaction history may be viewed on the touch display 312 of the electronic device 300. Moreover, the payment transaction history may also be viewed from a mobile phone 710 having a larger screen 720. With reference to FIG. 7B, a wireless connection may be established between the electronic device 300 and a mobile phone 710 through bluetooth or Wi-Fi. The electronic device 300 transmits the payment transaction history to the mobile phone 710 through the wireless module 310 as shown in FIG. 3A.

In all the embodiments mentioned above, each of the processing module 106 and the processing module 306 may be a central processing unit (CPU), a microprocessor or a processing unit.

In all the embodiments mentioned above, the storage module 108 and the storage module 308 may respectively be non-volatile memory such as read only memory (ROM), programmable read only memory (PROM), erasable programmable read only memory (EPROM), and electrically erasable programmable read only memory (EEPROM) devices, volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs), and magnetic storage devices such as hard disk drives (HDD) and floppy disk drives.

Based on the aforesaid embodiments, the electronic device and the authentication method provide a more secure and efficient payment mechanism for the user to conduct contactless payment.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic device, comprising:
    a sensor module;
    a network module;
    a buckle mechanism;
    at least one processor; and
    a non-transitory computer-readable medium storing a first prestored biometric signature and computer-executable instructions to be executed by the at least one processor for performing an authentication method, wherein the first prestored biometric signature is verified and issued by a first payment service, and the authentication method comprises:
    setting a first threshold value and a second threshold value, wherein the first threshold value is set to be less than the second threshold value;
    storing the first and second biometric samples in the electronic device;
    sampling a first biometric input by the sensor module for a first sampling time duration and calculating a first biometric signature according to the sampled first biometric input;
    determining that the buckle mechanism is fastened;
    calculating a first difference between the first biometric signature and the first prestored biometric signature stored in the electronic device;
    determining whether the first difference is less than or equal to the first threshold value or not and based on the determination that the first difference is less than or equal to the first threshold value, the first biometric signature is determined to match the first prestored biometric signature;
    authenticating the first payment service, wherein the first difference is less than or equal to the first threshold value and the buckle mechanism is fastened;
    invalidating the first payment service when the buckle mechanism is open or when the first difference is not less than or equal to the first threshold value;
    sampling a second biometric input by the sensor module for a second sampling time duration when the first difference is less than or equal to the first threshold value and calculating the second biometric signature according to the sampled second biometric input, wherein the first sampling time duration is equal to or greater than the second sampling time duration;
    calculating a second difference between the second biometric signature and a second prestored biometric signature; and
    determining whether the second difference is less than or equal to the second threshold value or not, wherein when the second difference is less than or equal to the second threshold value, the second biometric signature is determined to match the second prestored biometric signature;
    activating a transmission of data corresponding to the first payment service by the network module when the second difference is less than or equal to the second threshold value; and
    disabling the transmission of the data corresponding to the first payment service by the network module when the second difference is not less than or equal to the second threshold value.

2. The electronic device of claim 1, wherein the second biometric signature and the second prestored biometric signature are cardiac pulses, and the second biometric signature is determined to match the second prestored biometric signature if a number of pulses corresponding to the second biometric signature is greater than 0.

3. The electronic device of claim 1, further comprises:
    detecting a confirmation input; and
    detecting the second biometric signature by the sensor module when or after the confirmation input is detected.

4. The electronic device of claim 1, wherein the first prestored biometric signature and the second prestored biometric signature are a same biometric signature or different biometric signatures.

5. The electronic device of claim 1, wherein the first biometric signature is an electrocardiography, and the sensor module comprises a first sensor and a second sensor, in which the first sensor and the second sensor are configured to detect the electrocardiography.

6. A non-transitory computer-readable storage medium storing instructions to be implemented by an electronic device having a processor, wherein the instructions, when executed by the processor, cause the electronic device to perform the steps of:
    setting a first threshold value and a second threshold value, wherein the first threshold value is set to be less than the second threshold value;
    storing the first and second biometric samples in the electronic device;
    sampling a first biometric input by a sensor module of the electronic device for a first sampling time duration and calculating a first biometric signature according to the sampled first biometric input;
    determining that the buckle mechanism is fastened;
    calculating a first difference between the first biometric signature and a first prestored biometric signature stored in the electronic device;
    determining whether the first difference is less than or equal to the first threshold value or not and based on the determination that the first difference is less than or equal to the first threshold value, the first biometric signature is determined to match the first prestored biometric signature;
    authenticating the first payment service, wherein the first difference is less than or equal to the first threshold value and the buckle mechanism is fastened;
    invalidating the first payment service when the first difference is not less than or equal to the first threshold value;
    sampling a second biometric input by the sensor module for a second sampling time duration when the first difference is less than or equal to the first threshold value and calculating the second biometric signature according to the sampled second biometric input, wherein the first sampling time duration is equal to or greater than the second sampling time duration;

calculating a second difference between the second biometric signature and a second prestored biometric signature; and determining whether the second difference is less than or equal to the second threshold value or not, wherein when the second difference is less than or equal to the second threshold value the second biometric signature is determined to match the second prestored biometric signature;

activating a transmission of data corresponding to the first payment service by the network module when the second difference is less than or equal to the second threshold value; and disabling the transmission of the data corresponding to the first payment service by the network module when the second difference is not less than or equal to the second threshold value.

7. The authentication method of claim 6, wherein the second biometric signature and the second prestored biometric signature are cardiac pulses, and the second biometric signature is determined to match the second prestored biometric signature if a number of pulses corresponding to the second biometric signature is greater than 0.

8. The authentication method of claim 6, further comprises:

detecting a confirmation input; and detecting the second biometric signature by the sensor module when or after the confirmation input is detected.

9. The authentication method of claim 6, wherein the first prestored biometric signature and the second prestored biometric signature are a same biometric signature or different biometric signatures.

10. The authentication method of claim 6, wherein the first biometric signature is an electrocardiography, and the sensor module comprises a first sensor and a second sensor that are configured to detect the electrocardiography.

* * * * *